US011080677B2

(12) United States Patent
Tripathi et al.

(10) Patent No.: US 11,080,677 B2
(45) Date of Patent: Aug. 3, 2021

(54) COMPUTER-IMPLEMENTED SYSTEM, METHOD, AND COMPUTER PROGRAM PRODUCT FOR AUTOMATICALLY LINKING ACCOUNTS IN AN ELECTRONIC WALLET

(71) Applicant: Visa International Service Association, San Francisco, CA (US)

(72) Inventors: Anup Tripathi, Foster City, CA (US); Santanu Deb Roy, Foster City, CA (US); Anjan Ahmed, Foster City, CA (US); Ashish Gyanendra Kumar Mehta, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 193 days.

(21) Appl. No.: 15/782,260

(22) Filed: Oct. 12, 2017

(65) Prior Publication Data

US 2019/0114611 A1    Apr. 18, 2019

(51) Int. Cl.
*G06Q 20/22* (2012.01)
*G06Q 20/36* (2012.01)
*G06Q 30/02* (2012.01)
*G06Q 20/10* (2012.01)

(52) U.S. Cl.
CPC ......... *G06Q 20/227* (2013.01); *G06Q 20/105* (2013.01); *G06Q 20/229* (2020.05); *G06Q 20/36* (2013.01); *G06Q 20/363* (2013.01); *G06Q 20/3676* (2013.01); *G06Q 30/0207* (2013.01)

(58) Field of Classification Search
CPC ............... G06Q 20/227; G06Q 20/105; G06Q 20/3578; G06Q 20/363; G06Q 30/0207
USPC ........................................................... 705/41
See application file for complete search history.

(56) References Cited

U.S. PATENT DOCUMENTS

| | | | | |
|---|---|---|---|---|
| 7,155,411 B1* | 12/2006 | Blinn | ................... | G06Q 20/02 705/40 |
| 9,984,368 B2* | 5/2018 | McCandless | .......... | G06Q 20/32 |
| 10,484,345 B2* | 11/2019 | Shastry | ................ | H04L 63/068 |
| 10,796,415 B2* | 10/2020 | Koyama | ............ | G06K 9/00671 |
| 2011/0035319 A1* | 2/2011 | Brand | ................... | G06Q 20/10 705/44 |
| 2015/0088753 A1* | 3/2015 | Van Derschueren | ....................... | G06Q 20/351 705/67 |

(Continued)

OTHER PUBLICATIONS

"Prevention Lost or Stolen Wallet? Here's What to Do" (Year: 2018).*

*Primary Examiner* — Bruce I Ebersman
(74) *Attorney, Agent, or Firm* — The Webb Law Firm

(57) ABSTRACT

A method for automatically linking accounts in an electronic wallet includes: receiving first account data corresponding to a first portable financial device stored in an electronic wallet; determining user information corresponding to the first account data; determining, based on the user information, whether a second portable financial device is associated with the user; determining second account data corresponding to the second portable financial device, wherein the second account data is not stored in the electronic wallet corresponding to the user; and automatically linking the second account data to the electronic wallet. A system and computer program product for automatically linking accounts in the electronic wallet are also disclosed.

11 Claims, 7 Drawing Sheets

(56) References Cited

U.S. PATENT DOCUMENTS

| 2015/0154588 | A1* | 6/2015 | Purves | G06Q 30/0226 |
| | | | | 705/14.27 |
| 2018/0096335 | A1* | 4/2018 | Moghaizel | G06Q 20/227 |

* cited by examiner

All Cards of John E. Doe

| Card | Cardholder Name | PAN | Issuer |
|---|---|---|---|
| Card 1 | John E. Doe | 0012-1132-4275-0123 | First Issuer |
| Card 2 | John E. Doe | 1131-6751-0827-0084 | First Issuer |
| Card 3 | John E. Doe | 2468-1012-1416-1820 | Second Issuer |
| Card 4 | Doe Corp. | 3434-8211-7716-3230 | Third Issuer |
| Card 5 | John E. Doe & Jane F. Doe | 4895-7612-7787-1234 | First Issuer |

Card Offers

| Card | Offers |
|---|---|
| Card 1 | - 10,000 sign-up points<br>- 3 points per dollar spent on travel purchases<br>- 1 point per dollar spent on all other purchases |
| Card 2 | - Unlimited 2% cash back on all purchases |
| Card 3 | - Spend $2,000 in first 3 months, get $50 cash back<br>- 3% cash back on groceries<br>- 2% cash back on gas |
| Card 4 | - 2% cash back on restaurants<br>- 1.5% cash back on office supplies |
| Card 5 | - 1.75 airline miles per dollar spent |

FIG. 4A

Offers for Transaction A

| Card | Cash Value of Offer | Comments |
|---|---|---|
| Card 1 | $ 1.00 | - 10,000 sign-up points already applied<br>- 100 points |
| Card 2 | $ 2.00 | —————— |
| Card 3 | $ 3.00 | - $50 cash back already earned |
| Card 4 | $ 0.00 | —————— |
| Card 5 | $ 2.63 | - 175 miles |

FIG. 4B

COMPUTER-IMPLEMENTED SYSTEM, METHOD, AND COMPUTER PROGRAM PRODUCT FOR AUTOMATICALLY LINKING ACCOUNTS IN AN ELECTRONIC WALLET

BACKGROUND OF THE INVENTION

Field of the Invention

The present invention relates to an electronic wallet, and in one non-limiting embodiment or aspect, a computer-implemented method, system, and computer program product for automatically linking accounts in an electronic wallet.

Description of Related Art

In today's economy, consumers commonly carry multiple portable financial devices (e.g., credit cards and/or debit cards) in order to initiate transactions with merchants accepting such forms of payment. The portable financial devices held by the consumer may have been issued by the same or different issuer institutions. The account data for these portable financial devices may be stored in the consumer's electronic wallet, which may be an application on their mobile device (e.g., a smartphone or tablet) and/or a server. Electronic wallets eliminate the need to carry the physical portable financial device and provide convenience at the point of sale by initiating transactions using the mobile device.

However, managing an electronic wallet presents certain challenges to the consumer as well. In existing electronic wallets, the consumer is required to enter the account data for each of their portable financial devices into the electronic wallet so that each portable financial device is available to conveniently initiate transactions. Furthermore, existing electronic wallets require the consumer to replace the account data of lost, stolen, or expired portable financial devices in order to have the updated account data available. Therefore, there is a need in the art for an improved way of managing account data in electronic wallets.

Many issuers offer rewards (e.g., cash back, points, airline miles, and the like) to consumers based on the consumer's spending using a portable financial device. The various rewards programs offered vary widely in type and allow consumers to select the portable financial device(s) that best fit their spending habits. Selecting certain portable financial devices based on those spending habits allows consumers to maximize rewards received for their purchases.

Because of the varying rewards available to consumers and because consumers typically carry multiple portable financial devices, it can be difficult to select the portable financial device that offers the best rewards for a particular transaction at the point of sale. For example, a first credit card may offer the best rewards for a purchase of a certain item or during a certain period of time, while a second credit card may offer the best reward for the purchase of a different item or during a different period of time. Therefore, there is a need in the art for an improved way of managing rewards offers from multiple portable financial devices using an electronic wallet.

SUMMARY OF THE INVENTION

According to a non-limiting embodiment or aspect, provided is a computer-implemented method for automatically linking accounts in an electronic wallet associated with a user, including: receiving, with at least one processor, first account data corresponding to a first portable financial device of a user, the first account data stored in an electronic wallet corresponding to the user; automatically determining, with at least one processor, user information corresponding to the user based at least partially on the first account data; automatically determining, with at least one processor, and based at least partially on the user information, whether at least one second portable financial device is associated with the user; in response to determining that the at least one second portable financial device is associated with the user, determining, with at least one processor, second account data corresponding to the at least one second portable financial device, wherein the second account data is not stored in the electronic wallet corresponding to the user; and in response to determining the second account data, automatically linking the second account data to the electronic wallet associated with the user.

In one non-limiting embodiment or aspect, the method further includes: in response to receiving a transaction request to initiate a transaction using the electronic wallet associated with the user, generating a recommendation of a portable financial device based at least partially on the transaction request, the first account data, and the second account data. The recommendation may be generated by receiving, with at least one processor, the first account data and the second account data; analyzing, with at least one processor, transaction data associated with the transaction request; determining, with at least one processor, first rewards benefits for the transaction request corresponding to the first portable financial device; determining, with at least one processor, second rewards benefits for the transaction request corresponding to the second portable financial device; and generating, with at least one processor, the recommendation based on the determined first rewards benefits and second rewards benefits.

In one non-limiting embodiment or aspect, the transaction data may include at least one of: the first account data, the second account data, transaction amount, merchant category code, goods and/or services associated with the transaction, transaction date, transaction type, and merchant offers. The first account data and/or the second account data may include at least one of: user name, user personal information, user bank identification number, portable financial device card verification value (cvv) code, portable financial device account identifier, portable financial device expiration date, portable financial device issuer data, portable financial device type, transaction spend limit on the portable financial device, outstanding balance on the portable financial device, cumulative transaction spend on the portable financial device, and at least one offer corresponding to the portable financial device. The method may further include automatically processing, with at least one processor the transaction request using the account data corresponding to the recommended portable financial device, in response to generating the recommendation. The method may further include: determining, with at least one processor, a status of a portable financial device linked to the electronic wallet as lost, stolen, or expired; receiving, with at least one processor, updated account data corresponding to the lost, stolen, or expired portable financial device; and in response to receiving the updated account data, linking, with at least one processor, the updated account data to the electronic wallet associated with the user.

According to another non-limiting embodiment or aspect, provided is a system for automatically linking accounts in an electronic wallet associated with a user, having at least one server computer including at least one processor, the at least one server computer programmed and/or configured to: receive first account data corresponding to a first portable financial device of a user, the first account data stored in an electronic wallet corresponding to the user; automatically determine user information corresponding to the user based at least partially on the first account data; automatically determine, based at least partially on the user information, whether at least one second portable financial device is associated with the user; in response to determining that the at least one second portable financial device is associated with the user, determine, with at least one processor, second account data corresponding to the at least one second portable financial device, wherein the second account data is not stored in the electronic wallet corresponding to the user; and in response to determining the second account data, automatically link the second account data to the electronic wallet associated with the user.

In one non-limiting embodiment or aspect, the at least one server computer may be programmed and/or configured to, in response to receiving a transaction request to initiate a transaction using the electronic wallet associated with the user, generate a recommendation of a portable financial device based at least partially on the transaction request, the first account data, and the second account data. To generate the recommendation, the at least one server computer may be programmed and/or configured to receive the first account data and the second account data; analyze transaction data associated with the transaction request; determine first rewards benefits for the transaction request corresponding to the first portable financial device; determine second rewards benefits for the transaction request corresponding to the second portable financial device; and generate the recommendation based on the determined first rewards benefits and second rewards benefits.

In one non-limiting embodiment or aspect, the transaction data may include at least one of: the first account data, the second account data, transaction amount, merchant category code, goods and/or services associated with the transaction, transaction date, transaction type, and merchant offers. The first account data and/or the second account data may include at least one of: user name, user personal information, user bank identification number, portable financial device cvv code, portable financial device account identifier, portable financial device expiration date, portable financial device issuer data, portable financial device type, transaction spend limit on the portable financial device, outstanding balance on the portable financial device, cumulative transaction spend on the portable financial device, and at least one offer corresponding to the portable financial device. The at least one server computer may be programmed and/or configured to automatically process the transaction request using the account data corresponding to the recommended portable financial device in response to generating the recommendation. The at least one server computer may be programmed and/or configured to determine a status of a portable financial device linked to the electronic wallet as lost, stolen, or expired; receive updated account data corresponding to the lost, stolen, or expired portable financial device; and in response to receiving the updated account data, link the updated account data to the electronic wallet associated with the user.

According to another non-limiting embodiment or aspect, provided is a computer program product for automatically linking accounts in an electronic wallet associated with a user including at least one non-transitory computer-readable medium including program instructions that, when executed by at least one processor, cause the at least one processor to: receive first account data corresponding to a first portable financial device of a user, the first account data stored in an electronic wallet corresponding to the user; automatically determine user information corresponding to the user based at least partially on the first account data; automatically determine, based at least partially on the user information, whether at least one second portable financial device is associated with the user; in response to determining that the at least one second portable financial device is associated with the user, determine, with at least one processor, second account data corresponding to the at least one second portable financial device, wherein the second account data is not stored in the electronic wallet corresponding to the user; and in response to determining the second account data, link the second account data to the electronic wallet associated with the user.

In one non-limiting embodiment or aspect, the program instructions, when executed by the at least one processor, cause the at least one processor to, in response to receiving a transaction request to initiate a transaction using the electronic wallet associated with the user, generate a recommendation of a portable financial device based at least partially on the transaction request, the first account data, and the second account data. The program instructions, when executed by the at least one processor, cause the at least one processor to receive the first account data and the second account data; analyze transaction data associated with the transaction request; determine first rewards benefits for the transaction request corresponding to the first portable financial device; determine second rewards benefits for the transaction request corresponding to the second portable financial device; and generate the recommendation based on the determined first rewards benefits and second rewards benefits.

In one non-limiting embodiment or aspect, the transaction data may include at least one of: the first account data, the second account data, transaction amount, merchant category code, goods and/or services associated with the transaction, transaction date, transaction type, and merchant offers. The first account data and/or the second account data may include at least one of: user name, user personal information, user bank identification number, portable financial device cvv code, portable financial device account identifier, portable financial device expiration date, portable financial device issuer data, portable financial device type, transaction spend limit on the portable financial device, outstanding balance on the portable financial device, cumulative transaction spend on the portable financial device, and at least one offer corresponding to the portable financial device. The program instructions, when executed by the at least one processor, cause the at least one processor to automatically process the transaction request using the account data corresponding to the recommended portable financial device, in response to generating the recommendation. The program instructions, when executed by the at least one processor, cause the at least one processor to determine a status of a portable financial device linked to the electronic wallet as lost, stolen, or expired; receive updated account data corresponding to the lost, stolen, or expired portable financial device; and in response to receiving the updated account data, link the updated account data to the electronic wallet associated with the user.

Further embodiments or aspects are set forth in the following numbered clauses:

Clause 1: A computer-implemented method for automatically linking accounts in an electronic wallet associated with a user, comprising: receiving, with at least one processor, first account data corresponding to a first portable financial device of a user, the first account data stored in an electronic wallet corresponding to the user; automatically determining, with at least one processor, user information corresponding to the user based at least partially on the first account data; automatically determining, with at least one processor, and based at least partially on the user information, whether at least one second portable financial device is associated with the user; in response to determining that the at least one second portable financial device is associated with the user, determining, with at least one processor, second account data corresponding to the at least one second portable financial device, wherein the second account data is not stored in the electronic wallet corresponding to the user; and in response to determining the second account data, automatically linking the second account data to the electronic wallet associated with the user.

Clause 2: The method of clause 1, further comprising: in response to receiving a transaction request to initiate a transaction from the electronic wallet associated with the user, generating a recommendation of a portable financial device based at least partially on the transaction request, the first account data, and the second account data.

Clause 3: The method of clause 1 or 2, wherein the recommendation is generated by: receiving, with at least one processor, the first account data and the second account data; analyzing, with at least one processor, transaction data associated with the transaction request; determining, with at least one processor, first rewards benefits for the transaction request corresponding to the first portable financial device; determining, with at least one processor, second rewards benefits for the transaction request corresponding to the second portable financial device; comparing, with at least one processor, the first rewards benefits to the second rewards benefits; and generating, with at least one processor, the recommendation based on the comparison of the first rewards benefits to the second rewards benefits.

Clause 4: The method of any of the preceding clauses, wherein the transaction data comprises at least one of: transaction amount, merchant category code, goods and/or services associated with the transaction request, transaction date, transaction type, and merchant offers.

Clause 5: The method of any of the preceding clauses, wherein the first account data and the second account data comprises at least one of: user name, user personal information, user bank identification number, portable financial device card verification value (cvv) code, portable financial device account identifier, portable financial device expiration date, portable financial device issuer, portable financial device type, transaction spend limit on the portable financial device, outstanding balance on the portable financial device, cumulative transaction spend on the portable financial device, and at least one offer corresponding to the portable financial device.

Clause 6: The method of any of the preceding clauses, further comprising: in response to generating the recommendation, automatically processing, with at least one processor the transaction request using the account data corresponding to the recommended portable financial device.

Clause 7: The method of any of the preceding clauses, further comprising: determining, with at least one processor, a status of a portable financial device linked to the electronic wallet as lost, stolen, or expired; receiving, with at least one processor, updated account data corresponding to the lost, stolen, or expired portable financial device; and in response to receiving the updated account data, linking, with at least one processor, the updated account data to the electronic wallet associated with the user.

Clause 8: A system for automatically linking accounts in an electronic wallet associated with a user, comprising at least one server computer including at least one processor, the at least one server computer programmed and/or configured to: receive first account data corresponding to a first portable financial device of a user, the first account data stored in an electronic wallet corresponding to the user; automatically determine user information corresponding to the user based at least partially on the first account data; automatically determine, based at least partially on the user information, whether at least one second portable financial device is associated with the user; and in response to determining that the at least one second portable financial device is associated with the user, determine, with at least one processor, second account data corresponding to the at least one second portable financial device, wherein the second account data is not stored in the electronic wallet corresponding to the user; in response to determining the second account data, automatically link the second account data to the electronic wallet associated with the user.

Clause 9: The system of clause 8, wherein the at least one server computer is programmed and/or configured to: in response to receiving a transaction request to initiate a transaction from the electronic wallet associated with the user, generate a recommendation of a portable financial device based at least partially on the transaction request, the first account data, and the second account data.

Clause 10: The system of clause 8 or 9, wherein to generate the recommendation, the at least one server computer is programmed and/or configured to: receive the first account data and the second account data; analyze transaction data associated with the transaction request; determine first rewards benefits for the transaction request corresponding to the first portable financial device; determine second rewards benefits for the transaction request corresponding to the second portable financial device; compare the first rewards benefits to the second rewards benefits; and generate the recommendation based on the comparison of the first rewards benefits to the second rewards benefits.

Clause 11: The system of any of clauses 8-10, wherein the transaction data comprises at least one of: transaction amount, merchant category code, goods and/or services associated with the transaction request, transaction date, transaction type, and merchant offers.

Clause 12: The system of any of clauses 8-11, wherein the first account data and the second account data comprises at least one of: user name, user personal information, user bank identification number, portable financial device card verification value (cvv) code, portable financial device account identifier, portable financial device expiration date, portable financial device issuer, portable financial device type, transaction spend limit on the portable financial device, outstanding balance on the portable financial device, cumulative transaction spend on the portable financial device, and at least one offer corresponding to the portable financial device.

Clause 13: The system of any of clauses 8-12, wherein the at least one server computer is programmed and/or configured to: in response to generating the recommendation, automatically process the transaction request using the account data corresponding to the recommended portable financial device.

Clause 14: The system of any of clauses 8-13, wherein the at least one server computer is programmed and/or configured to: determine a status of a portable financial device linked to the electronic wallet as lost, stolen, or expired; receive updated account data corresponding to the lost, stolen, or expired portable financial device; and in response to receiving the updated account data, link the updated account data to the electronic wallet associated with the user.

Clause 15: A computer program product for automatically linking accounts in an electronic wallet associated with a user comprising at least one non-transitory computer-readable medium including program instructions that, when executed by at least one processor, cause the at least one processor to: receive first account data corresponding to a first portable financial device of a user, the first account data stored in an electronic wallet corresponding to the user; automatically determine user information corresponding to the user based at least partially on the first account data; automatically determine, based at least partially on the user information, whether at least one second portable financial device is associated with the user; in response to determining that the at least one second portable financial device is associated with the user, determine, with at least one processor, second account data corresponding to the at least one second portable financial device, wherein the second account data is not stored in the electronic wallet corresponding to the user; and in response to determining the second account data, link the second account data to the electronic wallet associated with the user.

Clause 16: The computer program product of clause 15, wherein the program instructions, when executed by the at least one processor, cause the at least one processor to: in response to receiving a transaction request to initiate a transaction from the electronic wallet associated with the user, generate a recommendation of a portable financial device based at least partially on the transaction request, the first account data, and the second account data.

Clause 17: The computer program product of clause 15 or 16, wherein to generate the recommendation, the program instructions, when executed by the at least one processor, cause the at least one processor to: receive the first account data and the second account data; analyze transaction data associated with the transaction request; determine first rewards benefits for the transaction request corresponding to the first portable financial device; determine second rewards benefits for the transaction request corresponding to the second portable financial device; compare the first rewards benefits to the second rewards benefits; and generate the recommendation based on the comparison of the first rewards benefits to the second rewards benefits.

Clause 18: The computer program product of any of clauses 15-17, wherein the transaction data comprises at least one of: transaction amount, merchant category code, goods and/or services associated with the transaction request, transaction date, transaction type, and merchant offers.

Clause 19: The computer program product of any of clauses 15-18, wherein the first account data and the second account data comprises at least one of: user name, user personal information, user bank identification number, portable financial device card verification value (cvv) code, portable financial device account identifier, portable financial device expiration date, portable financial device issuer, portable financial device type, transaction spend limit on the portable financial device, outstanding balance on the portable financial device, cumulative transaction spend on the portable financial device, and at least one offer corresponding to the portable financial device.

Clause 20: The computer program product of any of clauses 15-19, wherein the program instructions, when executed by the at least one processor, cause the at least one processor to: in response to generating the recommendation, automatically process the transaction request using the account data corresponding to the recommended portable financial device.

Clause 21: The computer program product of any of clauses 15-20, wherein the program instructions, when executed by the at least one processor, cause the at least one processor to: determine a status of a portable financial device linked to the electronic wallet as lost, stolen, or expired; receive updated account data corresponding to the lost, stolen, or expired portable financial device; and in response to receiving the updated account data, link the updated account data to the electronic wallet associated with the user.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which:

FIG. 4A is a table of one non-limiting embodiment or aspect of a list of offers for rewards from the portable financial devices from FIG. 2B;

FIG. 4B is a table of one non-limiting embodiment or aspect of a list of reward amounts for a Transaction A for the portable financial devices from FIG. 2B;

DESCRIPTION OF THE INVENTION

Figure 1:
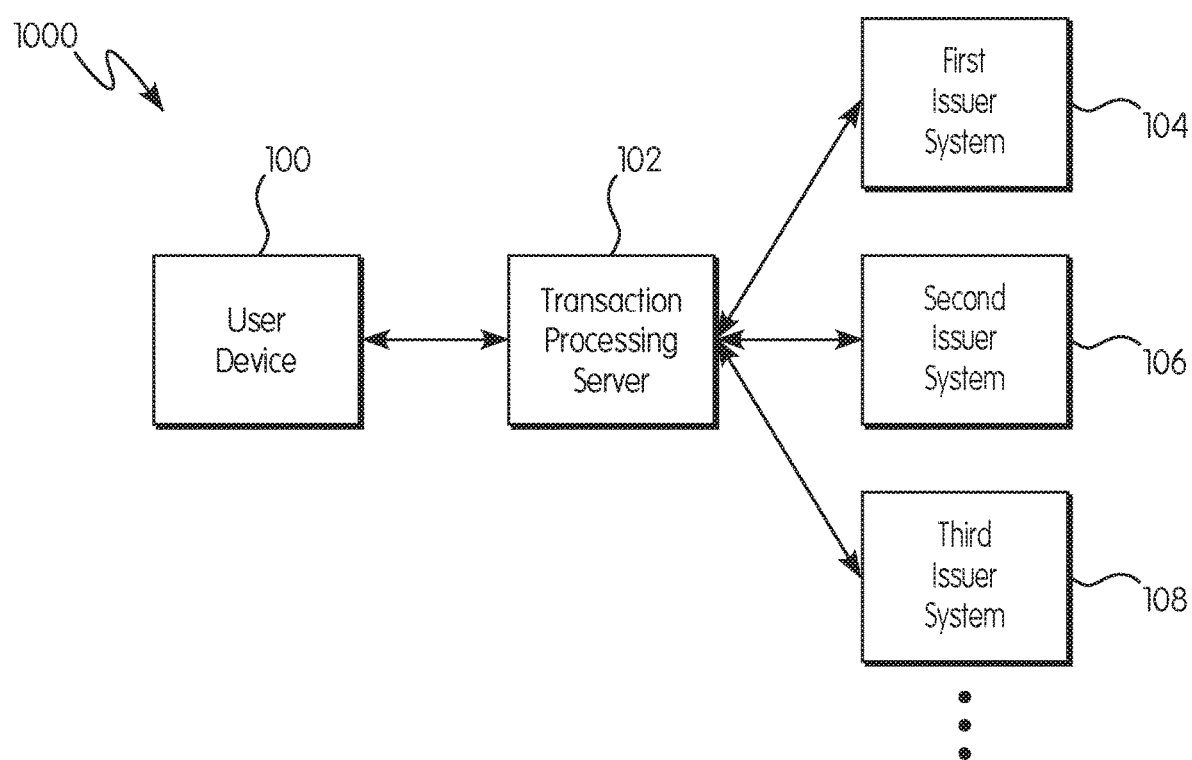
FIG. 1 is a schematic view of one non-limiting embodiment or aspect of a system for automatically linking accounts in an electronic wallet associated with a user.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" or "issuer" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, and the like), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices that are configured to directly or indirectly communicate with or over one or more networks. The computing device may be a mobile device. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account data, a keychain device or fob, an RFID transponder, a retailer discount or loyalty card, a mobile device executing an electronic wallet application, a personal digital assistant, a security card, an access card, a wireless terminal, and/or a transponder, as examples. The portable financial device may include a volatile or a non-volatile memory to store information, such as an account identifier or a name of the account holder.

The term "account data," as used herein, refers to any data concerning one or more accounts for one or more users. Account data may include, for example, one or more account identifiers, user identifiers, transaction histories, balances, credit limits, issuer institution identifiers, and/or the like.

A transaction message may be generated based on one or more transaction parameters from the transaction data, such as the transaction value, a transaction code, a merchant identifier (e.g., a unique merchant identifier, a merchant name, a merchant location, and/or the like), and/or other information concerning the transaction.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

Non-limiting embodiments or aspects of the present invention are directed to a computer-implemented method, system, and computer program product for automatically linking accounts in an electronic wallet associated with a user. Non-limiting embodiments or aspects of the present invention provide an improved electronic wallet that allows users to link the remainder of their portable financial devices to their electronic wallet upon entering account data for a single portable financial device. The present invention also allows users to automatically update account data of lost, stolen, or expired portable financial devices in their electronic wallet. Thus, the present invention allows for users to more easily manage the account data of their portable financial devices stored in their electronic wallet. Non-limiting embodiments or aspects of the present invention provide recommendations for users regarding the best portable financial device with which to initiate a transaction at the point of sale. Non-limiting embodiments or aspects of the present invention generates the recommendation based partially on the transaction request to ensure the portable financial device offering the best rewards for that specific transaction is being used. In this way, the present invention allows users to more effectively manage rewards offers at the point of sale to maximize earned rewards from their purchases. Moreover, in non-limiting embodiments or aspects of the invention, the electronic wallet may automatically select a preferred portable financial device for a transaction when interacting with a POS device.

Referring to FIG. 1, a system 1000 for automatically linking accounts in an electronic wallet associated with a user is shown. The system 1000 may include a user device 100 associated with a consumer (hereinafter "user"). The user device 100 may be a mobile device, such as a smartphone or tablet. However, it will be appreciated that the user device 100 may be any other type of computing device including an electronic wallet application capable of initiating transactions.

With continued reference to FIG. 1, the user device 100 may communicate with a transaction processing server 102. The transaction processing server 102 may be owned by or on behalf of a transaction service provider, and the transaction processing server 102 may include one or more processors, computers, storage devices, or the like.

With continued reference to FIG. 1, the transaction processing server 102 may communicate with at least one issuer system, such as a first issuer system 104, a second issuer system 106, and/or a third issuer system 108. Each issuer system may be owned by or on behalf of an issuer institution that issues portable financial devices to users to initiate transactions.

Figures 2A, 2B:
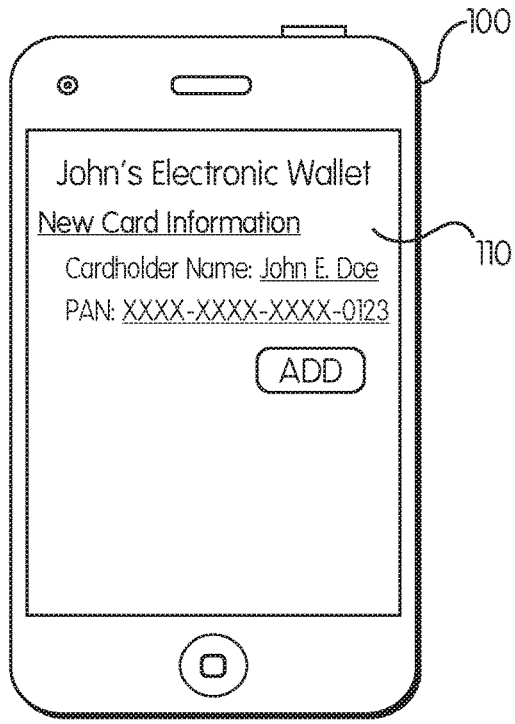
FIG. 2A is a view of one non-limiting embodiment or aspect of an interface by which a user may add a portable financial device to an electronic wallet.
FIG. 2B is a table of one non-limiting embodiment or aspect of a list of portable financial devices of a user.

With continued reference to FIGS. 1 and 2A, the user device 100 may include an electronic wallet application 110 (hereinafter "electronic wallet") configured to store account data associated with at least one portable financial device and to initiate transactions using those stored portable financial devices. The electronic wallet 110 may be associated with the user of the user device 100 (e.g., the electronic wallet 110 may include portable financial devices issued to the user by the issuer institution). The electronic wallet 110 may store account data for a portable financial device of the user by the user entering new card information into the user device 100, as shown in FIG. 2A. The user may enter the new card information into the user device 100 in any feasible manner, such as manually entering the relevant account data or taking a picture of the portable financial device using the user device 100 such that the user device 100 may automatically collect and enter the account data.

Upon entering the required account data of the portable financial device into the user device 100, the account data may be stored in the electronic wallet 110 of the user. Account data may include any relevant parameters associated with the portable financial device and/or an account corresponding to a portable financial device. Account data may include, but not be limited to: user name, user personal information (e.g., user social security number, user contact information, and the like), user bank identification number, portable financial device cvv code, portable financial device account identifier (e.g. PAN), portable financial device expiration date, portable financial device issuer data (e.g., issuer institution identifier), portable financial device type (e.g., credit or debit card), transaction spend limit on the portable financial device, outstanding balance on the portable financial device, cumulative transaction spend on the portable financial device, and at least one offer corresponding to the portable financial device. All or some subset of the account data may be required to store the portable financial device in the electronic wallet 110.

Figure 2C:
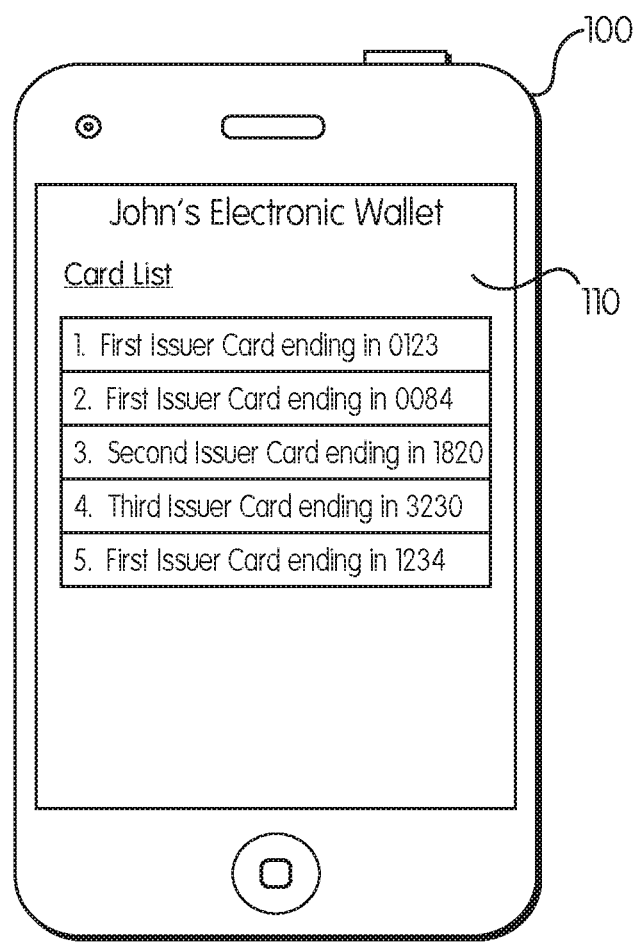
FIG. 2C is a view of one non-limiting embodiment or aspect of an interface showing the portable financial devices from FIG. 2B stored in an electronic wallet.

Referring to FIGS. 2B and 2C, the user may hold multiple portable financial devices associated with multiple accounts and wish to store these multiple portable financial devices in their electronic wallet 110 to initiate transactions. In some non-limiting examples, and as shown in FIG. 2B, the user may be the sole cardholder of the portable financial device (see Cards 1-3 from FIG. 2B). In some non-limiting examples, the user may be one user of multiple users on a business account (see Card 4 from FIG. 2B). In some non-limiting examples, the user may be one user of multiple users on a joint personal account (see Card 5 from FIG. 2B). The user may wish to store each of these portable financial devices on which he/she is a cardholder in the electronic wallet 110 (see FIG. 2C).

Referring back to FIG. 1, the system 1000 may automatically link the portable financial devices issued to the user and store them in the electronic wallet 110 based on the user entering account data of a single portable financial device for which they are a cardholder. The portable financial devices the user wishes to store in the electronic wallet 110 based on the user entering account data of the single portable financial device may be portable financial devices not already stored in the electronic wallet (the account data of those portable financial device is not already stored in the electronic wallet 110 corresponding to the user). The transaction processing server 102 may receive first account data corresponding to a first portable financial device of the user (stored in the user device 100 and/or ultimately electronic wallet 110 as previously described). From the received first account data, the transaction processing server 102 may automatically determine user information corresponding to the user. The user information may be information that would be common to the user across all portable financial devices held by the user, regardless of the issuer or transaction service provider. For example the user information may be any of the previously-described account data, such as user name, user social security number, user contact information, user bank identification number, and the like.

With continued reference to FIG. 1, the first, second, and third issuer systems 104, 106, 108, and any further issuer systems of issuer institutions which issue portable financial devices, may communicate with the transaction processing server 102. The issuer systems 104, 106, 108 may communicate account data of portable financial devices issued to users to the transaction processing server 102. The transaction processing server 102 may store this account data from the issuer systems 104, 106, 108, such as in a database of the transaction processing server 102. Therefore, the transaction processing server 102 may collect and store account data of portable financial devices issued by multiple issuers.

With continued reference to FIG. 1, based at least partially on the user information, the transaction processing server 102 may automatically determine whether a second portable financial device is associated with the user. The transaction processing server 102 may analyze the account data of the portable financial devices issued by the various issuers (received from the issuer systems 104, 106, 108) and stored in the transaction processing server 102 to determine whether any of the portable financial devices stored therein are associated with the user. The transaction processing server 102 may compare user information for the user to the account data for the portable financial devices issued by the various issuers to determine whether any of the portable financial devices are associated with the user (e.g., if one or more parameters of user information matches the corresponding stored account data of any portable financial devices issued by the various issuers). For example, the user information may include user name and/or user social security number, which may match the user name and user social security number of the second portable financial device account data of a second portable financial device, such that the transaction processing server 102 associates the user with the second portable financial device.

With continued reference to FIG. 1, in response to determining that a second portable financial device from the portable financial devices issued by the various issuers, the transaction processing server 102 may determine account data corresponding to the second portable financial device. In response to determining the second account data for the second portable financial device, the transaction processing server may communicate with the user device 100 to link the second account data (thus the second portable financial device) to the electronic wallet 110 of the user.

It will be appreciated that, based on the user information, the transaction processing server 102 may determine that multiple portable financial devices (see FIGS. 2B and 2C) may be associated with the user and may store the account data for these multiple portable financial devices in the electronic wallet 110 of the user. Therefore, upon entering account data of a single portable financial device into the user device 100, the transaction processing server 102 may link all of the user's available portable financial devices to the electronic wallet 110 of the user.

A portable financial device may be linked to the electronic wallet 110 of the user by storing account data for the portable financial device in the electronic wallet 110 and/or one or more servers in communication with the electronic wallet 110 such that it is associated with other user data. For example, the account data for the portable financial device may be stored in association with an electronic wallet identifier, user identifier, and/or one or more other portable financial devices in one or more databases and/or other data structures.

The portable financial devices associated with the user may be automatically linked to the electronic wallet 110 at the time the initial portable financial device is added by the user to the electronic wallet 110. Thus, all of the portable financial devices may be added to the electronic wallet 110 immediately following the addition of the first portable financial device to the electronic wallet 110 by the user (substantially in real time). This may allow for the user to add a single portable financial device to the electronic wallet 110 at the time of the transaction, such that the remainder of the user's portable financial devices are simultaneously linked to the electronic wallet 110, and the user may use any of the portable financial devices via the electronic wallet 110 to initiate that transaction. In some examples, the remainder of the portable financial devices (after the first portable financial device has been added to the electronic wallet 110 by the user) are not automatically linked to the electronic wallet at the same time the first portable financial device is added to the electronic wallet 110. For example, the user may specify a later time at which the remainder of the portable financial devices are to be automatically linked to the electronic wallet 110. For example, the user device 100 may periodically communicate with the transaction processing server 102 at a later time to automatically link the remainder of the portable financial devices associated with the user to the electronic wallet 110 (such as hourly, at the end of each day, weekly, and the like). For example, the remainder of the portable financial devices may be automatically linked to the electronic wallet 110 upon occurrence of a specified event, such as at the time of the next use of the electronic wallet 110 to initiate a transaction.

With continued reference to FIG. 1, the transaction processing server 102 may update account data of the portable financial devices stored in the electronic wallet 110 of the user. The transaction processor 102 may update the account data of a portable financial device stored in the electronic wallet 110 of the user upon that portable financial device expiring or being reported as lost or stolen. Thus, the account data of the portable financial devices stored in the electronic wallet 110 may be automatically updated.

With continued reference to FIG. 1, the transaction processing server 102 may determine the status of a portable financial device linked to the electronic wallet 110. The status of the portable financial device linked to the electronic wallet 110 may be determined periodically, such as hourly, daily, weekly, and the like. The status of the portable financial devices linked to the electronic wallet 110 may be determined upon the occurrence of some event, such as upon receipt of a transaction request by the transaction processing server 102, upon the expiration date of the portable financial device arriving, after the portable financial device is reported as lost or stolen, after the transaction processing server 102 or the appropriate issuer system 104, 106, 108 determines that the portable financial device is stolen, and the like. The status of the portable financial device may be determined to be: active, cancelled, expired, lost, and/or stolen.

Upon determining that the portable financial device is lost, stolen, or expired, the transaction processing server 102 may receive updated account data corresponding to the lost, stolen, or expired portable financial device. The updated account data may be received from the appropriate issuer system 104, 106, 108. For example, for a lost, stolen, or expired portable financial device, the updated account data may include a new (replacement) PAN number, expiration date, cvv code, and/or the like. In response to receiving the updated account data corresponding to the lost, stolen, or expired portable financial device, the transaction processing server 102 may communicate with the user device 100 to link the updated account data to the electronic wallet 110 of the user. This may include replacing the stored account data with the updated account data. In non-limiting examples in which the lost, stolen, or expired portable financial device is not being replaced with a replacement portable financial device, but is instead being cancelled, the updated account data may be blank so that the lost, stolen, or expired portable financial device is instead removed from the electronic wallet 110 of the user altogether.

Figure 3:
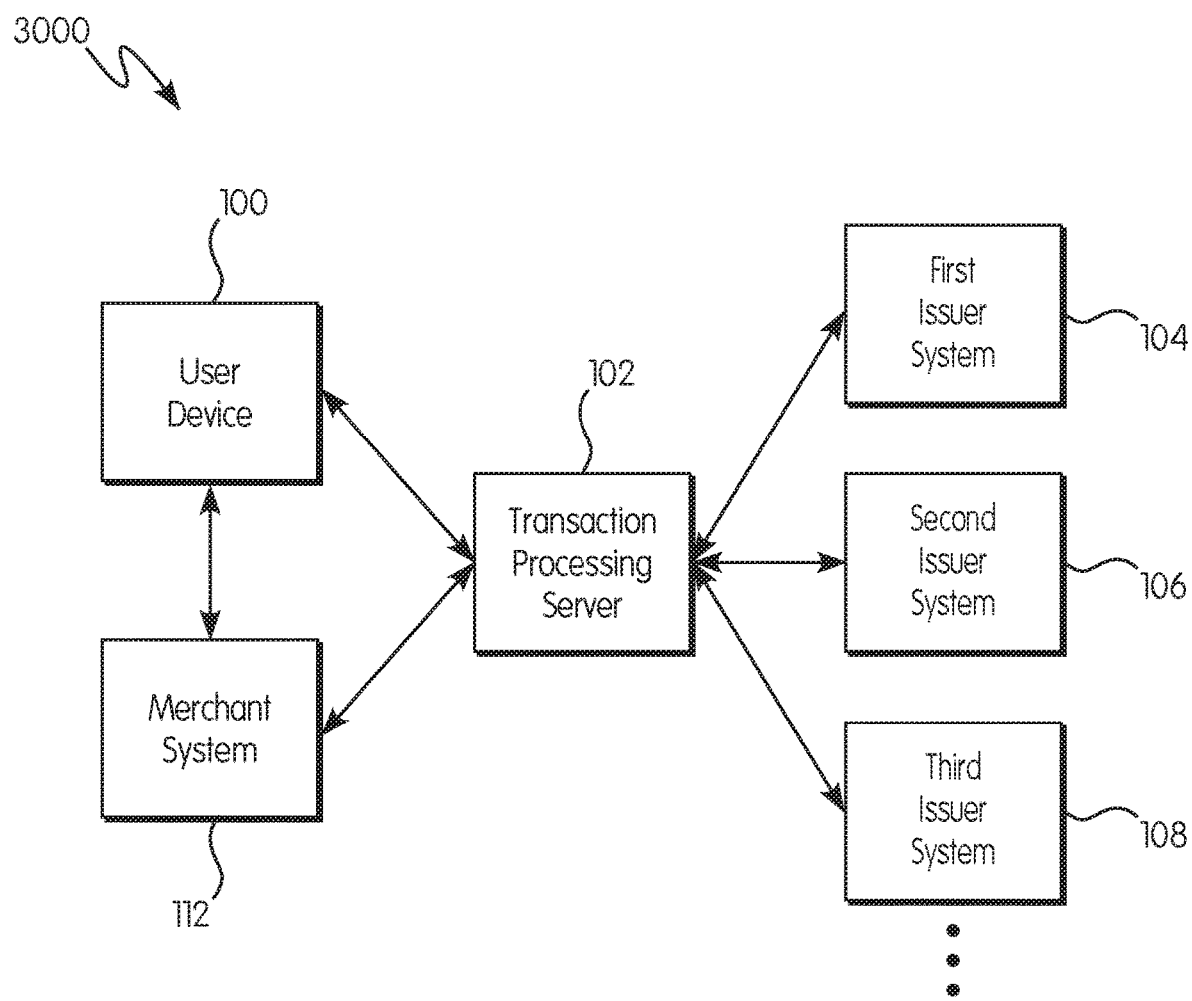
FIG. 3 is a schematic view of one non-limiting embodiment or aspect of a system for generating a recommendation of a portable financial device based at least partially on a transaction request.

Referring to FIG. 3, a system 3000 for generating a recommendation of a portable financial device based at least partially on a transaction request is shown. The system may include the user device 100 in communication with a merchant system 112 (e.g., a merchant POS system) operated by or on behalf of a merchant. The user device 100 may communicate with the merchant system 112 in order to initiate a transaction, such as for exchange of goods and/or services between the user and the merchant.

The user device 100 may communicate the account data associated with the electronic wallet 110 and/or the portable financial devices, constituting transaction data, and the merchant system 112 may generate other relevant transaction data. The other relevant transaction data may include at least one of: transaction amount, merchant category code, goods and/or services associated with a transaction, transaction date, transaction type, and merchant offers. The transaction data may include information required to further process the transaction (e.g., authorize, settle, and complete the transaction).

The merchant system may generate and communicate a transaction request to the transaction processing server 102 to initiate further processing of the transaction. The transaction may include all or some subset of the transaction data, and the transaction request may include the transaction data required for the further processing of the transaction. The transaction request may include as transaction data at least some of the account data of at least one portable financial device of the user stored on the electronic wallet 110 associated with the user.

With continued reference to FIG. 3, in response to receiving the transaction request from the merchant system 112, the transaction processing server 102 may generate a recommendation of a portable financial device in the user's electronic wallet 110 based at least partially on the transaction request and/or the account data of each portable financial device in the user's electronic wallet 110. The transaction processing server 102 may communicate this recommendation to the user device 100 (e.g., the electronic wallet 110 of the user device 100). Thus, the transaction processing server 102 may recommend the best portable financial device in the electronic wallet 110 for use in a transaction based on the rewards available for each portable financial device for that particular transaction.

With continued reference to FIG. 3, the transaction processing server 102 may generate the recommendation by receiving the account data for each portable financial device in the user's electronic wallet 110. The transaction processing server 102 may receive this account data from the user device 100, the merchant system 112, or the relevant issuer system 104, 106, 108, and the account data may have been previously stored in the transaction processing server 102 during linking of the portable financial devices to the electronic wallet 110. The account data may include data corresponding to at least one offer for one or more portable financial device in the electronic wallet 110 (see e.g., FIG. 4A).

With continued reference to FIG. 3, the transaction processing server 102 may analyze the transaction data associated with the transaction request (which it received from the merchant system 112 as previously described). The transaction processing server 102 may also determine rewards benefits for each portable financial device in the electronic wallet 110 of the user based partially on the transaction request (see e.g., FIG. 4B). For example, in an electronic wallet 110 including a first portable financial device having first account data and a second portable financial device having second account data, the transaction processing server 102 may determine a first reward benefit associated with the first portable financial device and a second reward benefit associated with the second portable financial device. The determined first reward benefit and second reward benefit may be based at least partially on the account data of the first and second portable financial device and the transaction data from the transaction request.

With continued reference to FIG. 3, the transaction processing server 102 may compare the rewards benefits of each portable financial device in the electronic wallet 110 of the user (see e.g., FIG. 4B). Based on the comparison, the transaction processing server 102 may communicate the recommendation to the user device 100 (having the electronic wallet 110 thereon) to recommend the portable financial device having the highest rewards benefit for that particular transaction request. The transaction processing server 102 may also communicate further details of the comparison, such as the amount of rewards benefit for each of the portable financial devices of the user in the electronic wallet 110 for that particular transaction request.

Referring to FIG. 4B, the reward benefit for each portable financial device stored in the electronic wallet 110 may be presented to the user (communicated to the user device) in any suitable form. For example, as shown in FIG. 4B, the transaction processing server 102 may communicate a cash value of the reward for the portable financial device (e.g., based on the currency relevant in the user's country). Certain rewards programs may offer a percentage cash back based on the currency value of the transaction request (e.g., Card 2 of FIGS. 4A and 4B) such that the cash value of the rewards is the percentage cash back multiplied by the transaction amount of the transaction request. In other examples, the rewards program of the portable financial device may be calculated using points, airline miles, or other alternate point systems known in the art. The transaction processing server 102 may translate this alternate point system into a cash value such that the rewards benefits can be compared using a standard metric (cash value in this case). However, it will be appreciated that the cash value of each reward may be converted to the alternate points system such that the rewards benefits can be compared using the alternate points system as the metric. Therefore, the transaction processing server 102 may communicate the rewards benefits for each portable financial device in the electronic wallet 110 using a standard metric across all of the portable financial devices. In other examples, the transaction processing server 102 may communicate the rewards benefits for each portable financial device in the electronic wallet 110 using original currency used as the reward for each particular portable financial device. For example, portable financial devices offering cash back may have a reward benefit communicated in cash value, while portable financial devices offering airline miles may have a reward benefit communicated in airline miles. It will be appreciated that other variations are possible.

Referring back to FIG. 3, in some non-limiting embodiments or aspects, upon receiving the recommendation from the transaction processing server 102, the user may indicate using the user device 100 whether the transaction should proceed using the recommended portable financial device from the electronic wallet 110, a different portable financial device from the electronic wallet 110, or another payment method. The user device 100 may communicate to the merchant system 112 or directly to the transaction processing server 102 which portable financial device (or other payment method) is to be used in connection with the transaction request. The transaction processing server 102 may then communicate an authorization request to the appropriate issuer system 104, 106, 108 (based on the portable financial device selected) to request further processing of the transaction corresponding to the transaction request.

Referring back to FIG. 3, in some non-limiting embodiments or aspects, in response to generating and communicating the recommendation to the user device 100, the transaction processing server 102 may automatically communicate the authorization request to the appropriate issuer system 104, 106, 108 using the account data corresponding to the recommended portable financial device (without further input from the user). Therefore, the transaction may proceed for further processing automatically with the portable financial device offering the highest reward benefit based on the transaction request and the account data of the portable financial devices in the electronic wallet 110 without required action by the user.

Figure 5:
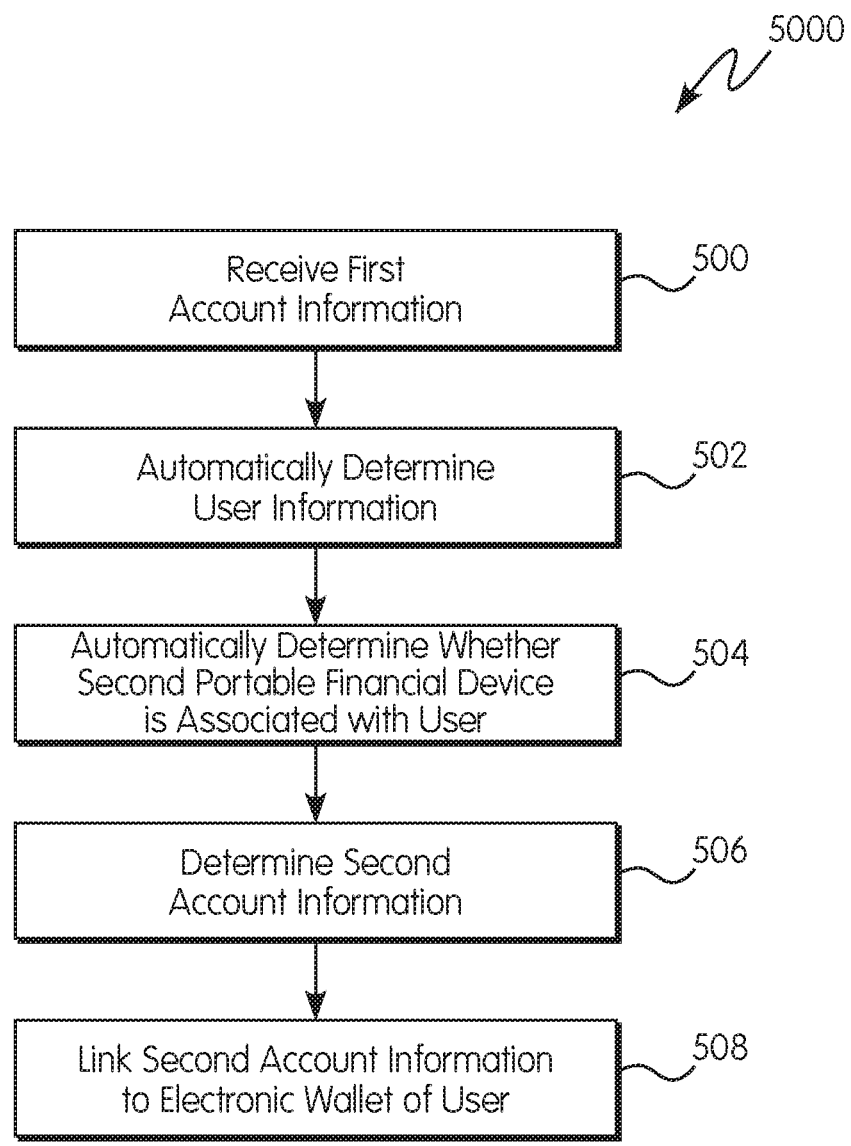
FIG. 5 is a step diagram of one non-limiting embodiment or aspect of a method for automatically linking accounts in an electronic wallet associated with a user.

Referring to FIG. 5, a computer-implemented method 5000 for automatically linking accounts in the electronic wallet 110 is shown. At step 500, the transaction processing server 102 may receive account data corresponding to a first portable financial device of a user. The first account data may be stored in the user's electronic wallet 110 on the user's user device 100 and may be communicated from the user device 100 to the transaction processing server 102. At a step 502, the transaction processing server 102 may automatically determine user information corresponding to the user based at least partially on the first account data. At a step 504, the transaction processing server 102 may automatically determine, based at least partially on the user information, whether at least one second portable financial device (from various issuer systems (e.g., first issuer system 104, second issuer system 106, and third issuer system 108)) is associated with the user.

With continued reference to FIG. 5, at a step 506, in response to determining that at least one second portable financial device is associated with the user, the transaction processing server 102 may determine second account data corresponding to the at least one second portable financial device. At a step 508, the transaction processing server 102 may link the determined second account data to the electronic wallet 110 of the user.

In a further non-limiting embodiment or aspect, a computer program product for automatically linking accounts in an electronic wallet includes at least one non-transitory computer-readable medium including program instructions that, when executed by at least one processor, cause the at least one processor to execute one of the methods described herein (e.g., method 5000 or method 6000). The computer program product may include a plurality of computer-readable media, such as a first computer-readable medium and a second computer-readable medium. The first computer-readable medium may be located at a transaction service provider. The second computer-readable medium may be located remote from the transaction service provider, such as at the user, the merchant, or the issuer institution.

The following example is provided to illustrate a non-limiting embodiment of the system, method, and computer program product for automatically linking accounts in an electronic wallet associated with a user and is not meant to be limiting.

Referring to FIGS. 1-6, John E. Doe may be a user and a cardholder of Cards 1-5 shown in FIG. 2B, which are credit cards (portable financial devices). John holds five credit cards from three different issuer institutions (First Issuer Bank, Second Issuer Bank, and Third Issuer Bank). As shown in FIG. 2B, John is the sole cardholder on Cards 1-3; Card 1 and Card 2 are issued by First Issuer Bank and Card 3 is issued by Second Issuer Bank. John is also a cardholder on his corporate card for Doe Corp., his privately owned construction business. This small business card is Card 4 and is issued by Third Issuer Bank. John is also a cardholder on a joint personal credit card with his wife, Jane F. Doe. This is Card 5 and is issued by First Issuer Bank.

Referring to FIG. 4A, Cards 1-5 each offer John a different rewards benefit, and the rewards benefit for each card is shown in the table of FIG. 4A. For some cards, John earns cash back (Cards 2-4), while for other cards John earns points or miles using an alternate point system (Cards 1 and 5).

Figure 6:
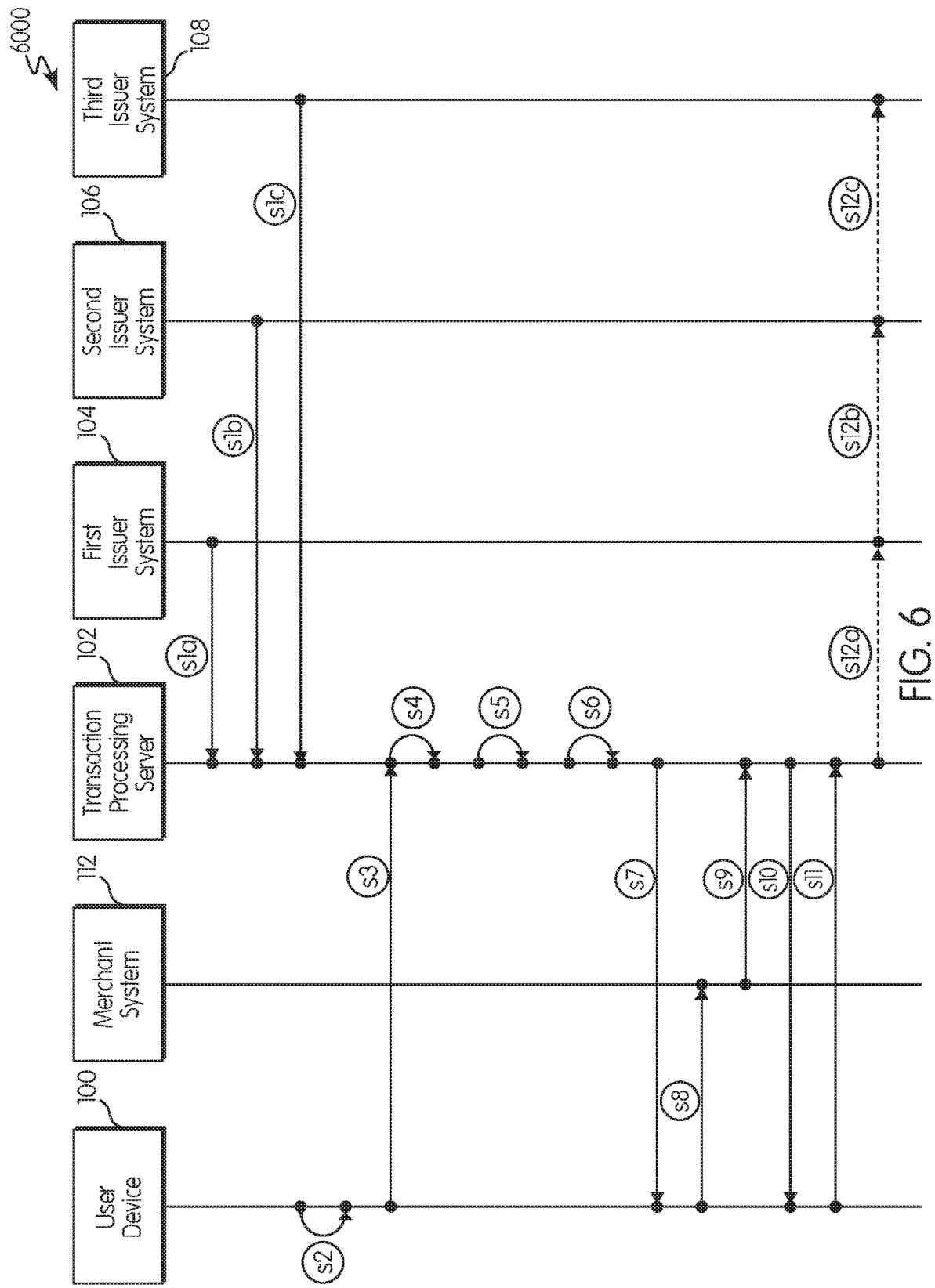
FIG. 6 is a process flow diagram of one non-limiting embodiment or aspect of a method for automatically linking accounts in an electronic wallet associated with a user.

Referring to FIG. 6, a method 6000 for automatically linking accounts in an electronic wallet 110 associated with a user is shown. At steps (s1a)-(s1c), the first issuer system 104 of First Issuer Bank (s1a), the second issuer system 106 of Second Issuer Bank (s1b), and the third issuer system 108 of Third Issuer Bank (s1c) communicate account data for the credit cards issued by these issuer institutions to the transaction processing server 102 of First Credit Card Company.

This includes account data for credit cards held by John and other cardholders associated with the First, Second, and/or Third Issuer Banks.

With continued reference to FIG. 6 and FIG. 2A, at a second step (s2) John enters account data for Card 1 into his user device 100, such as his smartphone. John enters the account data for Card 1 into the electronic wallet 110 on his user device 100. John may enter the account data (previously described) for Card 1 by entering the account data into new card information user interface, as shown in FIG. 2A, he may take a photograph of Card 1 with his user device 100 so that the user device 100 may collect and store the account data of Card 1, or he may enter the account data for Card 1 using any other suitable method. After the account data for Card 1 has been added, the account data for Card 1 is stored in John's electronic wallet 110 on his user device 100 and is available to initiate transactions.

With continued reference to FIG. 6, at a third step (s3), upon the account data for Card 1 being stored in John's electronic wallet 110, the user device 100 communicates at least a portion of this account data for Card 1 to the transaction processing server 102. At a fourth step (s4), the transaction processing server 102 determines the user information corresponding to John based at least partially on the account data for Card 1. At a fifth step (s5), the transaction processing server 102 automatically determines, based at least in part on the user information, whether any other credit card issued by the First, Second, or Third Issuer is associated with John. The transaction processing server 102 does this by analyzing the account data it received from the First Issuer System, Second Issuer System, and Third Issuer System in steps (s1a)-(s1c).

With continued reference to FIG. 6, at a sixth step (s6), in response to determining that at least one additional credit card (from the credit card issued by the First, Second, or Third Issuer) is associated with John, the transaction processing server 102 determines account data corresponding to those additional credit cards associated with John. In this example, four additional credit cards are associated with John (see FIG. 2B) for a total of five credit cards.

At a seventh step (s7) in FIG. 6, in response to determining the account data corresponding to those additional credit cards associated with John, the transaction processing server 102 communicates with the user device 100 to link the account data for those additional credit cards associated with John to John's electronic wallet 110. Thus, referring to FIG. 2C, upon John entering account data for Card 1, the remainder of John's credit cards may automatically be added to his electronic wallet 110.

With continued reference to FIG. 6, at an eighth step (s8), John goes to Grocer A and purchases $100 worth of groceries (Transaction A). John initiates Transaction A using his user device 100 including his electronic wallet 110, and the user device 100 communicates with the merchant system 112 of Grocer A to initiate the transaction. At a ninth step (s9), the merchant system 112 communicates a transaction request including the transaction data of Transaction A to the transaction processing server 102. The transaction processing server 102 analyzes the transaction data and determines rewards benefits available for John for each credit card in his electronic wallet 110. FIG. 4A shows the offers available for John's Cards 1-5. Based on the offers for Cards 1-5, the transaction processing server 102 determines the cash value of rewards benefits John would receive for Transaction A, which is shown in FIG. 4B. For Cards 1 and 5, which use alternate rewards systems (rewards points and airline miles, respectively), the transaction processing server 102 determines a cash value for the alternate rewards so that the comparison can be made using the same standard metric (cash value). In this example, 1 point is worth 1 cent for Card 1, and 1 airline mile is worth 1.5 cents for Card 5. In other examples, the transaction processing server 102 may not convert the rewards for Cards 1 and 5 to cash value.

Referring to FIG. 4B, for Transaction A, Card 3 offers the best reward benefit ($3 cash value). At a tenth step (s10) in FIG. 6, the transaction processing server 102 communicates its recommendation to John's user device 100 that Card 3 is the best credit card to use. At an eleventh step (s11), John's user device 100 communicates with the transaction processing server 102 to instruct the transaction processing server 102 regarding which credit card to use to continue processing Transaction A. John may accept the transaction processing server's 102 recommendation and select Card 3. Alternatively, John may select a different credit card and notify the transaction processing server 102 to proceed with that different credit card (such as Card 4 if Transaction A is instead a business transaction of Doe Corp.). In some examples, upon communicating the recommendation, the transaction processing server 102 automatically proceeds with processing Transaction A using the recommended credit card (Card 3), without requiring confirmation from the user device 100.

At a twelfth step (s12a-s12c), the transaction processing server 102 communicates an authorization request to one of the issuer systems 104, 106, 108 to request further processing of the transaction using the credit card selected for processing Transaction A. For example, if Cards 1, 2, or 5 are selected, the transaction processing server 102 communicates that authorization request to First Issuer System 104 (s12a). If Card 3 selected, the transaction processing server 102 communicates that authorization request to Second Issuer System 106 (s12b). If Card 4 selected, the transaction processing server 102 communicates that authorization request to Third Issuer System 108 (s12c).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for automatically linking accounts in an electronic wallet associated with a user, comprising:

receiving, with at least one processor and from a user interface of a user device comprising an electronic wallet, first account data comprising a first payment account identifier corresponding to a first payment account issued to the user by an issuer associated with a first issuer system for initiating at least one of a credit and a debit payment;

in response to receiving the first account data, automatically linking, with at least one processor, the first account data to the electronic wallet associated with the user;

in response to receiving the first account data, automatically determining, with at least one processor, user information corresponding to the user based at least partially on the first account data;

automatically determining, with at least one processor and based at least partially on the user information, whether at least one second payment account is issued to the user by an issuer for initiating at least one of a credit and a debit payment, wherein automatically determining whether the at least one second payment account is issued to the user comprises:

communicating, with at least one processor, a request message comprising the first account data or the user information to a plurality of issuer systems comprising a second issuer system to cause the second issuer system of the plurality of issuer systems to return data associated with the at least one second payment account based at least partially on the first account data or the user information; and receiving, with at least one processor, from the second issuer system the data associated with the at least one second payment account;

in response to determining that the at least one second payment account is associated with the user, determining, with at least one processor, second account data comprising a second payment account identifier from the data corresponding to the at least one second payment account, wherein the second account data is not stored in the electronic wallet associated with the user;

in response to determining the second account data, automatically linking the second account data to the electronic wallet associated with the user; and in response to the user initiating a payment transaction subsequent to the first account data being received:

determining, with at least one processor, a status of the first payment account identifier or the second payment account identifier as lost, stolen, or cancelled;

in response to determining that the first payment account identifier and/or the second payment account identifier is lost, stolen, or cancelled, receiving, with at least one processor, from the first issuer system or the second issuer system, updated account data associated with the first payment account or the at least one second payment account;

in response to receiving the updated account data, linking, with at least one processor, the updated account data to the electronic wallet in place of the lost, stolen, or cancelled first payment account identifier or second payment account identifier; and in response to receiving a transaction request to initiate a transaction using the electronic wallet associated with the user, generating a recommendation of a payment account based at least partially on the transaction request, the first account data, and the second account data, wherein the recommendation is generated by:

receiving, with at least one processor, the first account data and the second account data;

analyzing, with at least one processor, transaction data associated with the transaction request;

determining, with at least one processor, first rewards benefits for the transaction request corresponding to the first payment account;

determining, with at least one processor, second rewards benefits for the transaction request corresponding to the second payment account; and generating, with at least one processor, the recommendation based at least partially on the determined first rewards benefits and second rewards benefits, wherein the first account data or the second account data comprises at least one of the following: user name, user personal information, user bank identification number, portable financial device card verification value (cvv) code, portable financial device account identifier, portable financial device expiration date, portable financial device issuer data, portable financial device type, transaction spend limit on the portable financial device, outstanding balance on the portable financial device, cumulative transaction spend on the portable financial device, at least one offer corresponding to the portable financial device, or any combination thereof.

2. The method of claim 1, wherein the transaction data comprises at least one of the following: the first account data, the second account data, transaction amount, merchant category code, goods or services associated with the transaction, transaction date, transaction type, merchant offers, or any combination thereof.

3. The method of claim 1, further comprising:

in response to generating the recommendation, automatically processing, with at least one processor, the transaction request using the account data corresponding to the recommended payment account.

4. A system for automatically linking accounts in an electronic wallet associated with a user, comprising at least one server computer including at least one processor, the at least one server computer programmed or configured to:

receive, from a user interface of a user device comprising an electronic wallet, first account data comprising a first payment account identifier corresponding to a first payment account issued to the user by an issuer associated with a first issuer system for initiating at least one of a credit and a debit payment;

in response to receiving the first account data, automatically link, with at least one processor, the first account data to the electronic wallet associated with the user;

in response to receiving the first account data, automatically determine user information corresponding to the user based at least partially on the first account data;

automatically determine, based at least partially on the user information, whether at least one second payment account is issued to the user by an issuer for initiating at least one of a credit and a debit payment, wherein automatically determining whether the at least one second payment account is issued to the user comprises:

communicating a request message comprising the first account data or the user information to a plurality of issuer systems comprising a second issuer system to cause the second issuer system of the plurality of issuer systems to return data associated with the at least one second payment account based at least partially on the first account data or the user information; and receiving from the second issuer system the data associated with the at least one second payment account;

in response to determining that the at least one second payment account is associated with the user, determine, with at least one processor, second account data comprising a second payment account identifier from the data corresponding to the at least one second payment account, wherein the second account data is not stored in the electronic wallet associated with the user;

in response to determining the second account data, automatically link the second account data to the electronic wallet associated with the user; and in response to the user initiating a payment transaction subsequent to the first account data being received:
  determine a status of the first payment account identifier or the second payment account identifier as lost, stolen, or cancelled;
  in response to determining that the first payment account identifier or the second payment account identifier is lost, stolen, or cancelled, receive from the first issuer system or the second issuer system, updated account data associated with the first payment account or the at least one second payment account;
  in response to receiving the updated account data, link the updated account data to the electronic wallet in place of the lost, stolen, or cancelled first payment account identifier or second payment account identifier; and
in response to receiving a transaction request to initiate a transaction using the electronic wallet associated with the user, generate a recommendation of a payment account based at least partially on the transaction request, the first account data, and the second account data, wherein to generate the recommendation, the at least one server computer is programmed and/or configured to:
  receive the first account data and the second account data;
  analyze transaction data associated with the transaction request;
  determine first rewards benefits for the transaction request corresponding to the first payment account;
  determine second rewards benefits for the transaction request corresponding to the second payment account; and
  generate the recommendation based at least partially on the determined first rewards benefits and second rewards benefits,
  wherein the first account data or the second account data comprises at least one of the following: user name, user personal information, user bank identification number, portable financial device card verification value (cvv) code, portable financial device account identifier, portable financial device expiration date, portable financial device issuer data, portable financial device type, transaction spend limit on the portable financial device, outstanding balance on the portable financial device, cumulative transaction spend on the portable financial device, at least one offer corresponding to the portable financial device, or any combination thereof.

5. The system of claim 4, wherein the transaction data comprises at least one of the following: the first account data, the second account data, transaction amount, merchant category code, goods or services associated with the transaction, transaction date, transaction type, merchant offers, or any combination thereof.

6. The system of claim 4, wherein the at least one server computer is programmed or configured to:
in response to generating the recommendation, automatically process the transaction request using the account data corresponding to the recommended payment account.

7. The system of claim 4, wherein the electronic wallet comprises a mobile device having a mobile application stored thereon, wherein the mobile device is configured to initiate a transaction with a merchant by the mobile application.

8. A computer program product for automatically linking accounts in an electronic wallet associated with a user comprising at least one non-transitory computer-readable medium including program instructions that, when executed by at least one processor, cause the at least one processor to:
receive from a user interface of a user device comprising an electronic wallet, first account data comprising a first payment account identifier corresponding to a first payment account issued to the user by an issuer associated with a first issuer system for initiating at least one of a credit and a debit payment;
in response to receiving the first account data, automatically link, with at least one processor, the first account data to the electronic wallet associated with the user;
in response to receiving the first account data, automatically determine user information corresponding to the user based at least partially on the first account data;
automatically determine, based at least partially on the user information, whether at least one second payment account is issued to the user by an issuer for initiating at least one of a credit and a debit payment, wherein automatically determining whether the at least one second payment account is issued to the user comprises:
  communicating a request message comprising the first account data or the user information to a plurality of issuer systems comprising a second issuer system to cause the second issuer system of the plurality of issuer systems to return data associated with the at least one second payment account based at least partially on the first account data or the user information; and
  receiving from the second issuer system the data associated with the at least one second payment account;
in response to determining that the at least one second payment account is associated with the user, determine, with at least one processor, second account data comprising a second payment account identifier from the data corresponding to the at least one second payment account, wherein the second account data is not stored in the electronic wallet associated with the user;
in response to determining the second account data, automatically link the second account data to the electronic wallet associated with the user; and
in response to the user initiating a payment transaction subsequent to the first account data being received:
  determine a status of the first payment account identifier or the second payment account identifier as lost, stolen, or cancelled;
  in response to determining that the first payment account identifier or the second payment account identifier is lost, stolen, or cancelled, receive from the first issuer system or the second issuer system, updated account data associated with the first payment account or the at least one second payment account;
  in response to receiving the updated account data, link the updated account data to the electronic wallet in place of the lost, stolen, or cancelled first payment account identifier or second payment account identifier; and
  in response to receiving a transaction request to initiate a transaction using the electronic wallet associated with the user, generate a recommendation of a payment account based at least partially on the transaction request, the first account data, and the second account data, wherein to generate the recommendation, the program instructions, when executed by the at least one processor, cause the at least one processor to:
receive the first account data and the second account data;
analyze transaction data associated with the transaction request;
determine first rewards benefits for the transaction request corresponding to the first payment account;
determine second rewards benefits for the transaction request corresponding to the second payment account; and
generate the recommendation based at least partially on the determined first rewards benefits and second rewards benefits,
wherein the first account data or the second account data comprises at least one of the following: user name, user personal information, user bank identification number, portable financial device card verification value (cvv) code, portable financial device account identifier, portable financial device expiration date, portable financial device issuer data, portable financial device type, transaction spend limit on the portable financial device, outstanding balance on the portable financial device, cumulative transaction spend on the portable financial device, at least one offer corresponding to the portable financial device, or any combination thereof.

9. The computer program product of claim 8, wherein the transaction data comprises at least one of the following: the first account data, the second account data, transaction amount, merchant category code, goods or services associated with the transaction, transaction date, transaction type, merchant offers, or any combination thereof.

10. The computer program product of claim 8, wherein the program instructions, when executed by the at least one processor, cause the at least one processor to:
in response to generating the recommendation, automatically process the transaction request using the account data corresponding to the recommended payment account.

11. The computer program product of claim 8, wherein the electronic wallet comprises a mobile device having a mobile application stored thereon, wherein the mobile device is configured to initiate a transaction with a merchant by the mobile application.

\* \* \* \* \*